April 8, 1941.                    C. J. WAMSER                    2,237,750
                            ILLUMINATED DISPLAY SIGN
                             Filed Sept. 23, 1939
*Fig. 1.*
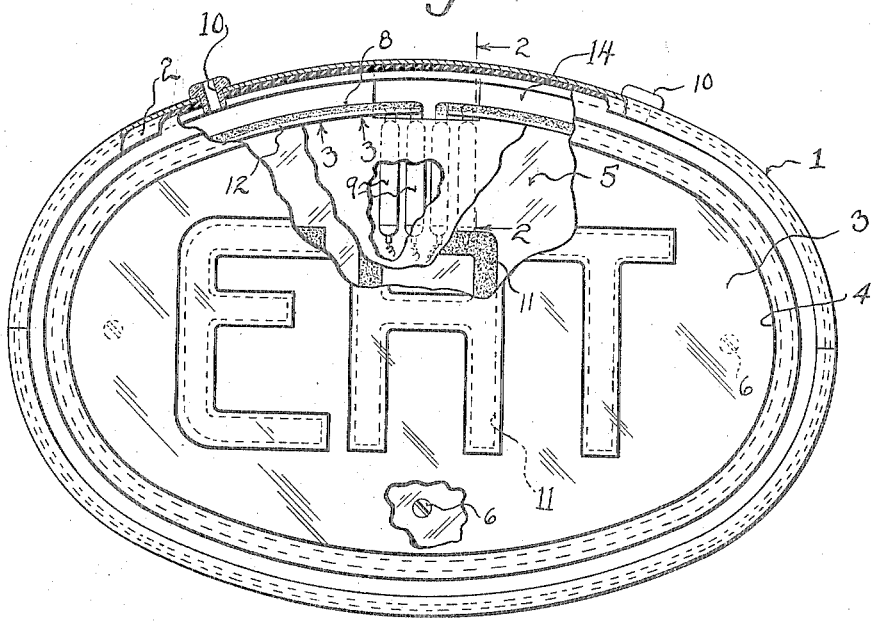
*Fig. 2.*
*Fig. 3.*
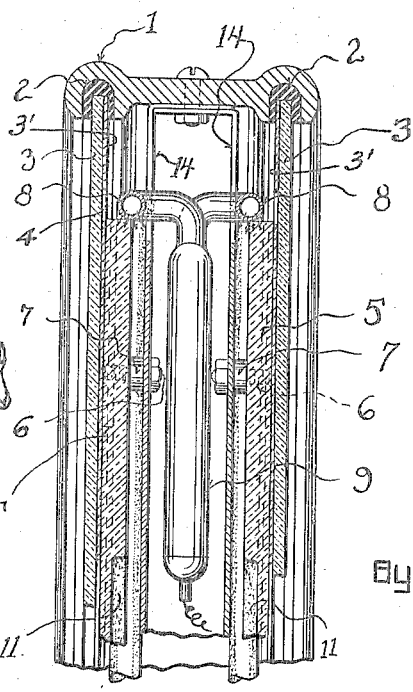
Inventor.
Charles J. Wamser
By
Attorneys.

Patented Apr. 8, 1941

2,237,750

UNITED STATES PATENT OFFICE 2,237,750

ILLUMINATED DISPLAY SIGN

Charles J. Wamser, Milwaukee, Wis.

Application September 23, 1939, Serial No. 296,234

2 Claims. (Cl. 40—130)

This invention relates to illuminated display signs, and more particularly to the type disclosed in United States Letters Patent No. 1,914,932, issued June 20, 1933, and utilizing a luminescent tube for illuminating strokes or characters formed upon a glass panel by sandblast cutting or by grooving the glass in any other fashion, such as by etching.

The principal object in signs of the foregoing type results from the fact that the sand-blasted surface of the characters offers such resistance to rays of light from he illuminating tube as to prevent uniform illumination of the entire message or character. In other words, the light rays permeate the glass panel through its edge to illuminate the sand-blasted strokes; but those portions of the strokes close to the illuminating tube become brilliantly lighted, while the inner portions are poorly illuminated and dull.

The present invention has primarily for its object to overcome the foregoing objections by the provision of an illuminated sign utilizing a luminescent tube, and so constructed as to uniformly reflect rays of light from the tube to all parts of the sand-blasted strokes or characters.

Incidental to the foregoing, a more specific object of the invention resides in the combination of an illuminated transparent panel provided with sand-blasted characters, and an opaque panel disposed in front of the sand-blasted panel and having translucent characters conforming with the sand-blasted characters.

Another object resides in the provision of a reflecting coating upon all opaque surfaces to provide uniform distribution of light rays from the luminescent tube to all parts of the characters.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing:

Figure 1 is a front elevation with parts broken away and in section to illustrate structural detail.

Figure 2 is an enlarged fragmentary transverse section taken on the line 2—2 of Figure 1; and Figure 3 is a fragmentary elevation of the luminescent tube illustrating the reflecting coating.

Referring now more particularly to the accompanying drawing, the numeral 1 designates a sectional extruded rim provided with annular grooves 2 adjacent its opposite edges for reception of panels 3, which may be formed of glass, metal, or composition, and provided with translucent strokes 4, the rest of the panels being opaque. In utilizing glass for the panels, the surfaces surrounding the strokes will be coated with an opaque material 3', preferably having reflecting properties, and should metal or an opaque material be utilized, the characters or strokes would be merely cut out.

Secured within the rim 2, and spaced from the panels 3, are opaque pans 14, to which transparent glasses 5 are secured by countersunk bolts 6 and spacing washers 7. Surrounding the glasses 5, and in close proximity to their peripheral edge, are luminescent tubes 8, having their electrodes 9 disposed between the spaced pans 14. The usual wires from the electrodes to the transformer may be passed out through bushings 10 carried by the rim.

The rear faces of the glasses 5 are provided with strokes 11 formed therein by the usual sandblast cutting process or any other method, such as etching, etc., and, as best shown in Figure 2, it is preferred to position the sand-blasted glasses 5 in contact with the panels 3, thus providing a clear sharp outline for the characters.

To facilitate illumination of the sand-blasted strokes of the glasses 6, it is proposed to coat the luminescent tube with a reflecting material 8', leaving a clear space 12 directed toward the glass, and the outer faces of the pans 14, which are also coated with a reflecting material.

As best shown in Figure 2, the translucent border stroke 4, provided in the panel 3, is illuminated directly by the tube 8, the reflecting coating 8' being such that the clear portion 12 of the tube faces the stroke as well as the edge of the glass 5, consequently reflecting light from the tube through the border stroke 4, the glass panel 5, and against the pans 14. This has a decided advantage, in that it produces a contrast between the border and character strokes.

While that form of the invention illustrated includes a sign having messages displayed upon both faces, it is to be understood that the salient features of the invention are applicable to a sign having a message upon only one face, in which event only one luminous tube and pan 14 is utilized, any suitable opaque closure being provided for the rear face of the sign.

From the foregoing explanation, considered in connection with the accompanying drawing, it will be apparent that an exceedingly effective and inexpensive illuminated display sign has been provided, which, because of the reflection and distribution of light from the luminescent tube, to all portions of the strokes or characters, results in brilliant and uniform illumination, which gives the effect of a luminous tube sign at considerable less cost and more attractive appearance, in that the characters are clear and sharply defined.

I claim:

1. A sign comprising an opaque panel, a transparent glass positioned in front of said panel and having strokes cut into its rear face, a luminescent tube positioned adjacent the periphery of said glass, and an opaque panel positioned in front of said glass and provided with translucent strokes conforming to those in said glass, the adjacent opaque surfaces of said panels being coated with a reflecting material.

2. A sign comprising an opaque panel, a transparent glass positioned in front of said panel and having strokes cut into its rear face, a luminescent tube positioned adjacent the periphery of said glass, an opaque panel positioned in front of said glass and provided with translucent strokes conforming to those in said glass, the adjacent opaque surfaces of said panels being coated with a reflecting material, and a reflecting coating covering a portion of said luminescent tube to direct rays of light in said tube towards the glass and panels.

CHARLES J. WAMSER.